US012050691B2

(12) United States Patent
Yamamoto et al.

(10) Patent No.: US 12,050,691 B2
(45) Date of Patent: Jul. 30, 2024

(54) SECURITY PROCESSING DEVICE

(71) Applicant: HITACHI ASTEMO, LTD., Hitachinaka (JP)

(72) Inventors: Naoyuki Yamamoto, Hitachinaka (JP); Hiroki Yamazaki, Hitachinaka (JP); Hitoshi Kawaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 290 days.

(21) Appl. No.: 17/626,456

(22) PCT Filed: Jul. 7, 2020

(86) PCT No.: PCT/JP2020/026520
§ 371 (c)(1),
(2) Date: Jan. 11, 2022

(87) PCT Pub. No.: WO2021/010224
PCT Pub. Date: Jan. 21, 2021

(65) Prior Publication Data
US 2022/0300612 A1    Sep. 22, 2022

(30) Foreign Application Priority Data

Jul. 12, 2019 (JP) .................................. 2019-129929

(51) Int. Cl.
*G06F 21/57* (2013.01)
*G06F 21/53* (2013.01)
*G06F 21/85* (2013.01)

(52) U.S. Cl.
CPC .............. *G06F 21/57* (2013.01); *G06F 21/53* (2013.01); *G06F 21/85* (2013.01)

(58) Field of Classification Search
CPC ........... G06F 21/57; G06F 21/53; G06F 21/85
See application file for complete search history.

(56) References Cited

U.S. PATENT DOCUMENTS

2010/0114530 A1   5/2010   Gaiser et al.
2017/0357560 A1   12/2017  Fukuda et al.
(Continued)

FOREIGN PATENT DOCUMENTS

CN    101738237 A   6/2010
CN    107077407 A   8/2017
(Continued)

OTHER PUBLICATIONS

Mukaido et al., "Risk Reduction", 1ˢᵗ Edition, Japanese Standards Association Group, 2013, pp. 205-208, ISBN: 978-4-542-30701-8.
(Continued)

*Primary Examiner* — Hee K Song
(74) *Attorney, Agent, or Firm* — Foley & Lardner LLP

(57) ABSTRACT

A security processing device which manages a device related to operation control of a vehicle includes a non-transitory computer-readable medium configured to store instructions executable by one or more processors. The non-transitory computer readable medium includes a non-secure area in which a mounted program is capable of being changed from an outside and a secure area in which a mounted program is incapable of being changed from the outside. The instructions cause a code of an operation program in the non-secure area to perform the operation control of the vehicle, and a diagnosis program in the secure area to diagnose an abnormality of the code of the operation program. When the abnormality of the operation program in the non-secure area is diagnosed, the instructions cause the diagnosis program in the secure area to determine a type of the abnormality and execute processing on a basis of the determined type.

6 Claims, 4 Drawing Sheets

(56) References Cited

U.S. PATENT DOCUMENTS

2018/0218548 A1* 8/2018 Smith ............... H04W 4/60
2018/0234390 A1* 8/2018 Camiel ............. G06F 9/452

FOREIGN PATENT DOCUMENTS

| | | |
|---|---|---|
| JP | 2014-151720 A | 8/2014 |
| JP | 2014-193690 A | 10/2014 |
| JP | 2017-128308 A | 7/2017 |
| JP | 2019-066995 A | 4/2019 |
| WO | WO-2017013622 A1 * 1/2017 | ............. G06F 13/36 |
| WO | WO-2017172434 A1 * 10/2017 | .......... G06F 11/1433 |

OTHER PUBLICATIONS

International Search Report with English translation and Written Opinion issued in corresponding application No. PCT/JP2020/026520 dated Nov. 2, 2020.

Office Action issued in corresponding Chinese Patent Application No. 202080043585.9, with English Machine Translation dated Jun. 29, 2023 (14 pages).

\* cited by examiner

FIG. 4

| Event after determination (24a) | Diagnosis result (software/hardware diagnosis) (24b) | Determination result (communication determination) (24c) | Fail-safe action from secure area (24d) |
|---|---|---|---|
| Invalidity of program A side | NORMALITY | NORMALITY | SWITCHING TO CODE B SIDE/REMOVAL OF CODE A SIDE |
| | ABNORMALITY | ABNORMALITY | REPROGRAMMING TO FULLY SHUTDOWN SOFTWARE/CONFIGURATION DEGENERATION |
| Invalidity of program B side | NORMALITY | ABNORMALITY | SWITCHING TO CODE A SIDE/REMOVAL OF CODE B SIDE/COMMUNICATION CONFIGURATION SWITCHING |
| | ABNORMALITY | NORMALITY | REPROGRAMMING TO DEGENERATION SOFTWARE |
| HW-component A failure | NORMALITY | NORMALITY | COMPONENT CHANGE CONFIGURATION SWITCHING |
| | ABNORMALITY | ABNORMALITY | REPROGRAMMING TO FULLY SHUTDOWN SOFTWARE/CONFIGURATION DEGENERATION |
| HW-component B failure | NORMALITY | ABNORMALITY | COMPONENT CHANGE CONFIGURATION SWITCHING/COMMUNICATION CONFIGURATION SWITCHING |
| | ABNORMALITY | NORMALITY | REPROGRAMMING TO DEGENERATION PROGRAM |
| Communication path C abnormality | NORMALITY | NORMALITY | REPROGRAMMING TO DEGENERATION SOFTWARE |
| | ABNORMALITY | NORMALITY | COMPONENT CHANGE CONFIGURATION SWITCHING |
| Communication path D abnormality | NORMALITY | ABNORMALITY | COMMUNICATION CHANGE CONFIGURATION SWITCHING/COMMUNICATION CONFIGURATION SWITCHING |
| | ABNORMALITY | ABNORMALITY | REPROGRAMMING TO FULLY SHUTDOWN SOFTWARE/CONFIGURATION DEGENERATION |

SECURITY PROCESSING DEVICE

TECHNICAL FIELD

The present invention relates to a security processing device.

BACKGROUND ART

In recent years, many pieces of software are used for controlling an automobile, and security measures in a vehicle against security attacks and the like are required. As a security measure, for example, tampering detection in secure boot has been discussed.

For example, PTL 1 discloses a software-tampering detection system including an electronic control unit which can be supplied with power from a battery power source, in which a first electronic control unit has a power source control unit for switching the battery power source from On to Off and, further, Off to On when it is determined that a host vehicle is parked, and one or more second electronic control units include tamper-detection units for detecting presence of tampering of software stored in a storage medium when the battery power source is switched to On to restart.

CITATION LIST

Patent Literature

PTL 1: JP 2014-151720 A

SUMMARY OF INVENTION

Technical Problem

In Europe, an E-safety vehicle instruction protected application (EVITA) project is implemented for security of automobiles, and microcomputer manufacturers manufacture a hardware security module (HSM) as hardware adapted to EVITA requirements. Then, in order to create a more secure ECU, an OEM and a supplier develop key management, decryption, random number generation, and host integrity verification as functions of the HSM.

However, in addition to the security function as described above, there are things that should be implemented from a secure area (HSM). That is, there is a possibility that a program code of the host is tampered with by a security attack, and there is a possibility that a malfunction occurs when a diagnosis function and a communication monitoring function are realized by the program code of the host. In addition, after the security attack is detected, it is necessary to more accurately distinguish the cause of the abnormality of the ECU and take a functional safety operation measure according to each cause.

The present invention has been made in view of the above, and an object of the present invention is to provide a security processing device capable of preventing tampering of software related to detection and diagnosis of abnormality such as a security attack and taking a measure according to a cause in a case where the abnormality occurs.

Solution to Problem

The present application includes a plurality of solutions to the above problem. As an example, a security processing device which manages a device related to operation control of a vehicle includes: a control part which includes a non-secure area in which a mounted program is capable of being changed from an outside and a secure area in which a mounted program is incapable of being changed from the outside. The control part includes a code of an operation program which is mounted in the non-secure area and performs the operation control of the vehicle, and a diagnosis program which is mounted in the secure area and diagnoses abnormality of the code of the operation program and monitors communication with the outside. In a case where the abnormality of the operation program in the non-secure area is diagnosed, the diagnosis program in the secure area determines a type of the abnormality and executes processing on the basis of the determined type.

Advantageous Effects of Invention

According to the present invention, it is possible to prevent tampering of software related to detection and diagnosis of abnormality such as a security attack and to take a measure according to a cause in a case where the abnormality occurs.

BRIEF DESCRIPTION OF DRAWINGS

FIG. 4 is a diagram illustrating an example of a functional safety determination table of a secure area.

DESCRIPTION OF EMBODIMENTS

Hereinafter, an embodiment of the present invention will be described with reference to the drawings.

Figure 1:
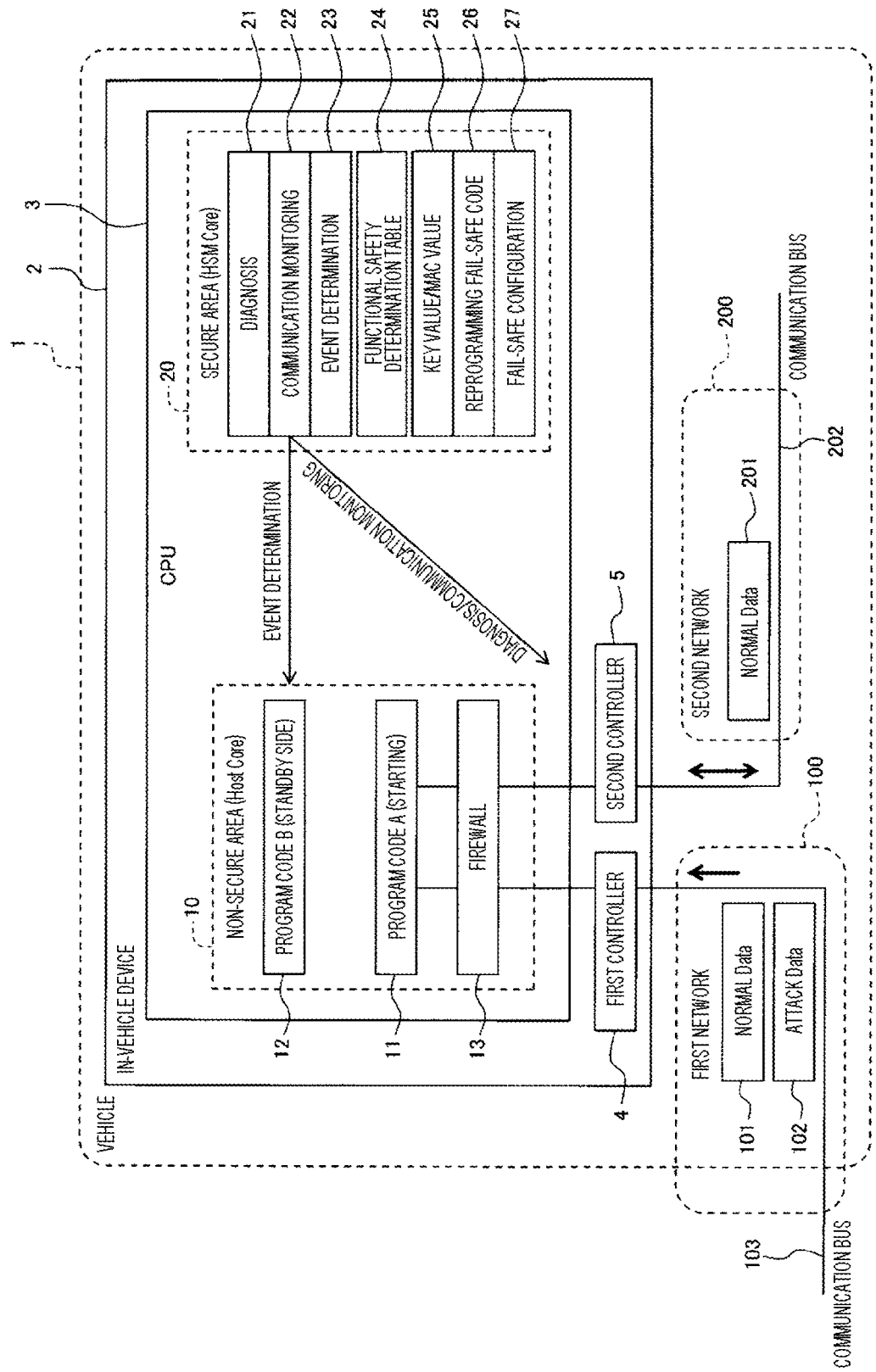
FIG. 1 is a functional block diagram schematically illustrating a security processing device extracted together with a related configuration.

FIG. 1 is a functional block diagram schematically illustrating a security processing device extracted together with a related configuration.

In FIG. 1, the functions of the security processing device are realized by an in-vehicle device 2 mounted on a vehicle 1. The in-vehicle device 2 connects a first network 100 and a second network 200 of a communication system mounted on the vehicle 1, and includes a CPU 3 which controls the operation of the in-vehicle device 2, a first controller 4 which controls communication between the in-vehicle device 2 and the first network, and a second controller 5 which controls communication between the in-vehicle device 2 and the inside of the vehicle 1.

The first network 100 includes a communication bus 103 which connects the outside of the vehicle 1 and the in-vehicle device 2, and a normal data frame 101 which is a communication data frame with the outside is transmitted to the in-vehicle device 2 via the communication bus 103. In addition, it is assumed that an attack data frame 102 which is an invalid data frame is also transmitted from the outside to the in-vehicle device 2. The normal data frame 101 and the attack data frame 102 are sent to the CPU 3 via the first controller of the in-vehicle device 2.

The second network 200 includes a communication bus 202 which connects the in-vehicle device 2 and the inside of the vehicle 1, and a normal data frame 201 which is a communication frame in the internal network of the vehicle 1 is transmitted and received via the communication bus 202. The normal data frame 201 is exchanged with the CPU 3 via the second controller of the in-vehicle device 2.

The CPU 3 includes a non-secure area (Host Core) 10 in which a mounted program or the like can be changed from the outside and a secure area (hardware security module (HSM) core) 20 in which a mounted program or the like cannot be changed from the outside.

A program code A side 11, a program code B side 12, and a security firewall 13 are mounted in a non-secure area (Host Core) 10 of the CPU 3. The non-secure area (Host Core) 10 is an area which can be changed from the outside of the in-vehicle device 2, and the program code A side 11 and the program code B side 12 are rewritable. However, the security firewall 13 protects against unauthorized access (entry of attack data) from the outside, and rewriting is suppressed in a range (range of non-breakthrough) in which the security firewall 13 functions.

A program which realizes each function of a diagnosis function 21, a communication monitoring function 22, and an event determination function 23 and each data such as a functional safety determination table 24, a key value/MAC value 25 for encryption/decryption, a reprogramming fail-safe code 26, and a fail-safe configuration 27 are mounted in a secure area (HSM Core) 20 in the CPU 3.

An operation of the security processing device according to this embodiment configured as described above will be described.

Figure 2:
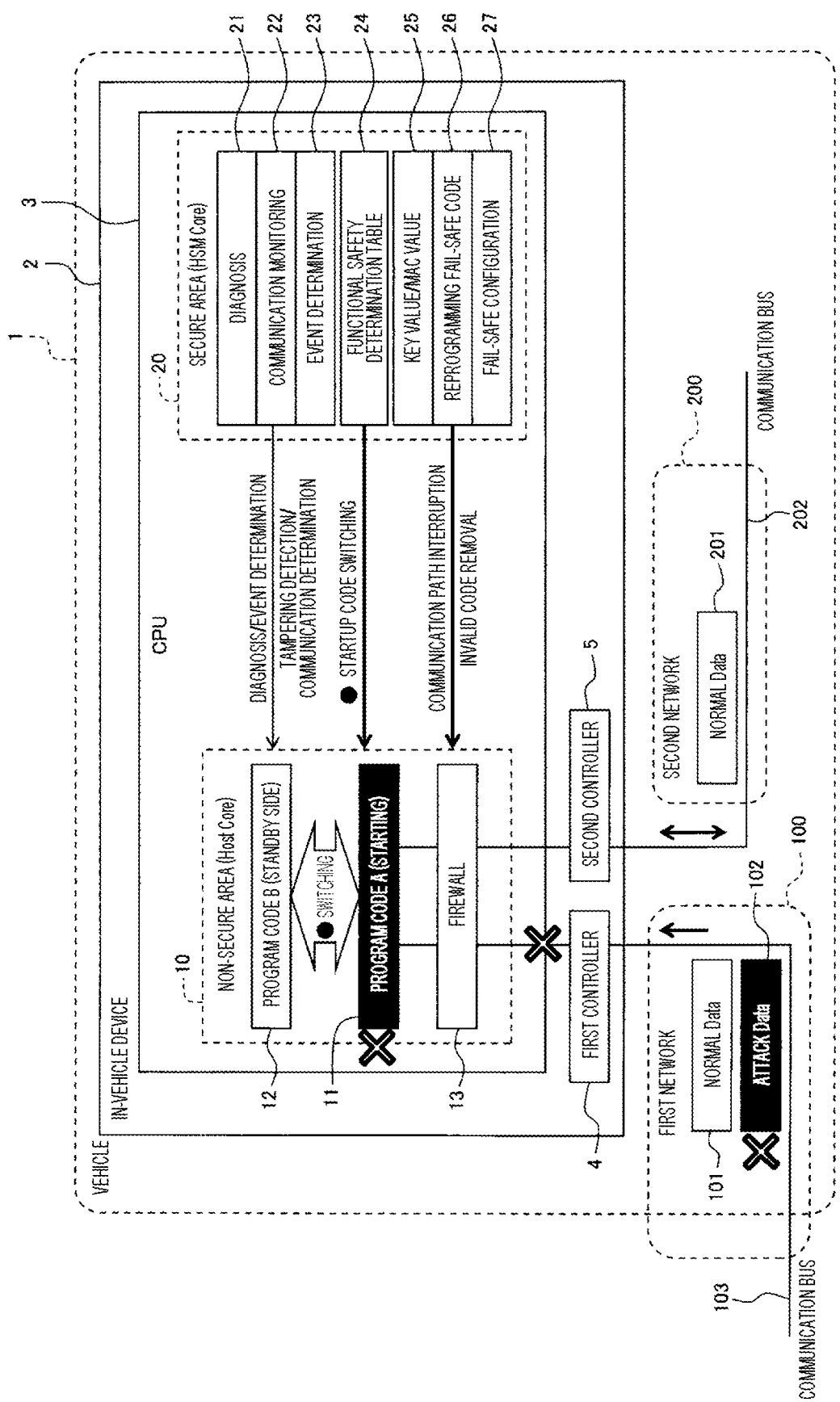
FIG. 2 is a functional block diagram schematically illustrating the security processing device extracted together with the related configuration, and is a diagram for describing an operation in a case where a part of a non-secure area is rewritten in an invalid manner as an example of a situation.

FIG. 2 is a functional block diagram schematically illustrating the security processing device extracted together with the related configuration, and is a diagram for describing an operation in a case where a part of a non-secure area is rewritten in an invalid manner as an example of a situation. Further, FIG. 3 is a flowchart illustrating an operation content of the security processing device.

Here, for example, a case is considered in which the attack data frame 102 is transmitted to the in-vehicle device 2 from the communication bus 103 with the outside of the first network 100, and the security firewall 13 is broken.

Figure 3:
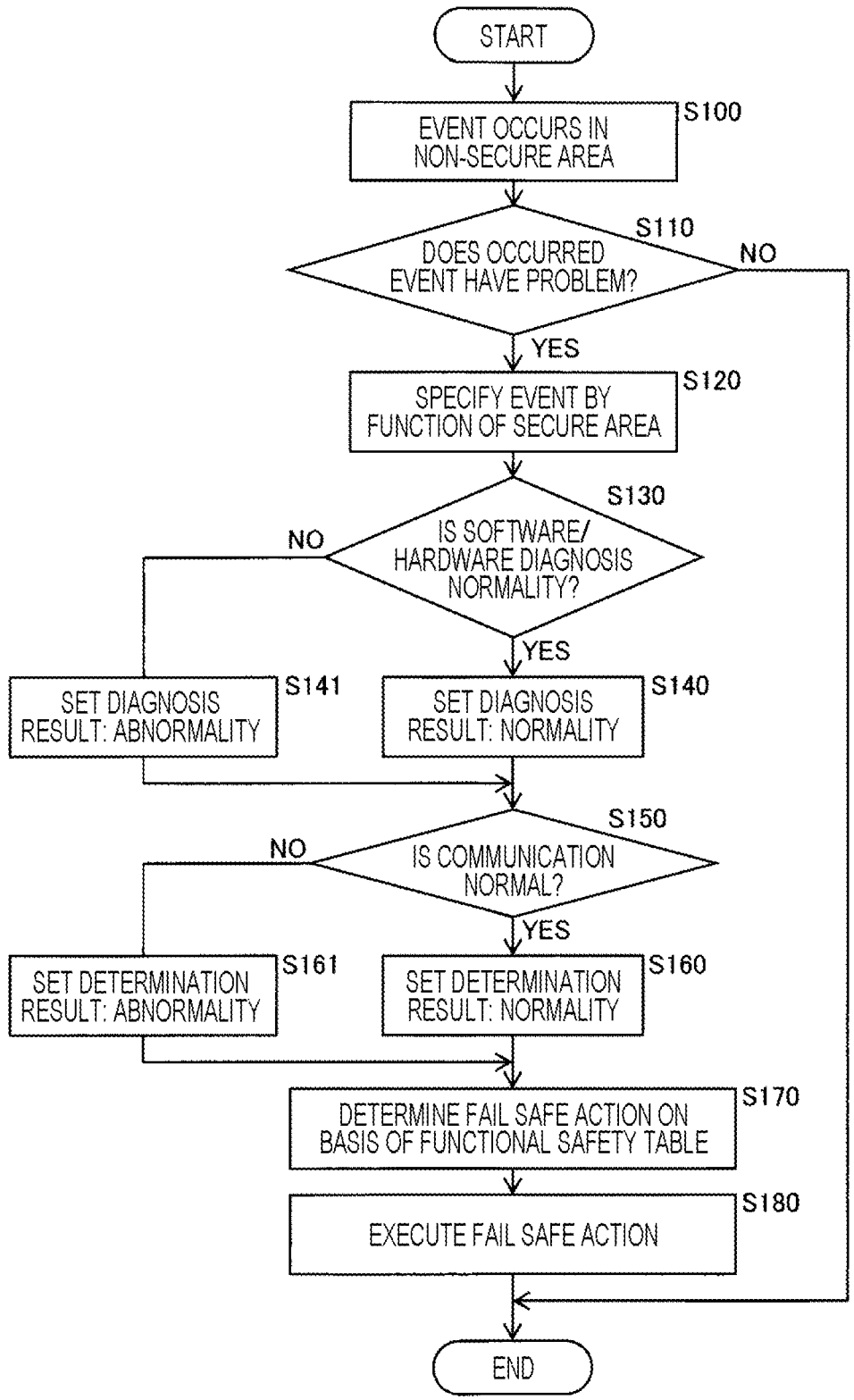
FIG. 3 is a flowchart illustrating operation content of the security processing device.

In FIG. 3, when an event occurs in the non-secure area (step S100), the security processing device determines whether or not the occurred event has a problem (step S110). The event determination function 23 of the secure area (HSM Core) 20 constantly performs tampering detection (software diagnosis) of the program code of the non-secure area (Host Core) 10 by using the key value/MAC value 25, and in a case where the event having occurred in the non-secure area (Host Core) 10 is tampering of the program code, it is possible to immediately detect the event. Similarly, the communication monitoring function 22 constantly monitors (communication determination) the invalidity of a communication path and a communication traffic, and in a case where the event having occurred in the non-secure area (Host Core) 10 has an invalidity related to the communication, it is possible to immediately detect the event. In addition, the diagnosis function 21 constantly diagnoses (hardware diagnosis) whether or not each hardware configuring the in-vehicle device 2 is normal, and in a case where the event having occurred in the non-secure area (Host Core) 10 has abnormality related to the hardware, it is possible to immediately detect the event.

In a case where the determination result in step S100 is NO, that is, a case where the event having occurred in the non-secure area (Host Core) 10 has no problem (for example, an event having occurred due to reception of the normal data frame 101 or the like), the process ends.

In a case where the determination result in step S100 is YES, that is, a case where the event having occurred in the non-secure area (Host Core) 10 has a problem, the content of the event is specified by each function (the diagnosis function 21, the communication monitoring function 22, the event determination function 23) of the secure area (HSM Core) 20 (step S120). As a problematic event, for example, tampering of the program code by reception of the attack data frame 102 is conceivable. When the attack data frame 102 is received from the communication bus 103 of the first network 100, and the security firewall 13 is broken, for example, the program code A side 11 of the non-secure area (Host Core) 10 in the CPU 3 is rewritten with an invalid program code (see FIG. 2).

Subsequently, it is determined whether or not the results of the software diagnosis and the hardware diagnosis among the contents of the event specified in step S120 are normality (step S130), and in a case where the determination result is YES, that is, a case where both the diagnosis results of the software diagnosis and the hardware diagnosis are normality, information of "normality" is set as the diagnosis result (step S140). Further, in a case where the determination result in step S130 is NO, that is, a case where at least one diagnosis result of the software diagnosis and the hardware diagnosis is abnormality, information of "abnormality" is set as the diagnosis result (step S141).

Subsequently, it is determined whether or not the result of the communication determination among the contents of the event specified in step S120 is normality (step S150), and in a case where the determination result is YES, information of "normality" is set as the determination result (step S160). Further, in a case where the determination result in step S150 is NO, that is, a case where the result of the communication determination is abnormality, information of "abnormality" is set as the determination result (step S161).

Subsequently, using the functional safety determination table 24 of the secure area (HSM Core) 20, a fail-safe action is determined on the basis of the diagnosis results (see steps S140 and S141) of the software diagnosis and the hardware diagnosis and the determination result (see steps S160 and S161) of the communication determination (step S170), the fail-safe action is executed (step S180), and the process ends.

FIG. 4 is a diagram illustrating an example of a functional safety determination table of the secure area.

In FIG. 4, in the functional safety determination table 24, for each of events 24*a* after the determination, a fail-safe action 24*d* from the secure area (HSM Core) 20 is defined for a combination of a diagnosis result 24*b* of the software diagnosis and the hardware diagnosis and a determination result 24*c* of the communication determination.

Examples of the fail-safe action include "switching of startup program code", "degeneration of configuration data", and "removal of invalid program code".

In the "switching of startup program code" of the fail-safe action, by the control instruction from the functional safety determination table 24 of the secure area (HSM Core) 20, the program code of the non-secure area (Host Core) 10 is switched from a starting program code A11 to a program code B12 on the standby side. The program code B12 has been verified by the diagnosis function 21 and has been diagnosed as normality.

In the "removal of invalid program code" of the fail-safe action, by the control instruction from the functional safety determination table 24 of the secure area (HSM Core) 20, the invalid program A11 in the non-secure area is rewritten to the reprogramming fail-safe code 26 (fail-safe program code) of the secure area (HSM Core) 20.

In the "degeneration of configuration data" of the fail-safe action, by the control instruction from the functional safety determination table 24 of the secure area (HSM Core) 20, the communication bus is interrupted, and the setting configuration of the first controller 4 is rewritten to the fail-safe configuration 27 of the secure area (HSM Core) 20. Incidentally, the "degeneration of configuration data" also includes rewriting configuration data set in each program or the like in the non-secure area (Host Core) 10 to the fail-safe configuration 27.

For example, as illustrated in FIG. 2, in a case where the program code A of the non-secure area (Host Core) 10 is rewritten in an invalid manner, the diagnosis result is set to "normality" in the software diagnosis (see step S141), and the determination result is set to "normality" in the communication determination (see step S160). Thus, in step S170, the program code A11 is switched to the program code B12 on the standby side as "switching of startup program code", and the program code A is removed.

In this embodiment configured as described above, it is possible to prevent tampering of software related to detection and diagnosis of abnormality such as a security attack and to take a measure according to a cause in a case where the abnormality occurs.

<Supplementary Note>

Note that the present invention is not limited to the above embodiment, and includes various modifications and combinations without departing from the gist of the present invention. In addition, the present invention is not limited to one including all the configurations described in the above embodiment, and includes one in which a part of the configuration is deleted. In addition, some or all of the above-described configurations, functions, and the like may be realized by, for example, designing with an integrated circuit. In addition, each of the above-described configurations, functions, and the like may be realized by software by a processor interpreting and executing a program for realizing each function.

REFERENCE SIGNS LIST 1 vehicle
2 in-vehicle device
4 first controller
5 second controller
10 non-secure area (Host Core)
11 program code A side
12 program code B side
13 security firewall
20 secure area (HSM Core)
21 diagnosis function
22 communication monitoring function
23 event determination function
24 functional safety determination table
24*a* event
24*b* diagnosis result
24*c* determination result
24*d* fail-safe action
25 key value/MAC value
26 reprogramming fail-safe code
27 fail-safe configuration
100 first network
101 normal data frame
102 attack data frame
103 communication bus
200 second network
201 normal data frame
202 communication bus

The invention claimed is:

1. A security processing device which manages a device related to operation control of a vehicle, the device comprising:
a non-transitory computer-readable medium configured to store instructions executable by one or more processors, the non-transitory computer readable medium including:
a non-secure area in which a mounted program is capable of being changed from an outside, and
a secure area in which a mounted program is incapable of being changed from the outside, wherein
the instructions, when executed by the one or more processors, cause:
a code of an operation program which is mounted in the non-secure area to perform the operation control of the vehicle, and
a diagnosis program which is mounted in the secure area to (i) diagnose an abnormality of the code of the operation program and (ii) monitor communication with the outside, and
in a case where the abnormality of the operation program in the non-secure area is diagnosed, the instructions, when executed by the one or more processors, cause the diagnosis program in the secure area to (i) determine a type of the abnormality and (ii) execute processing on a basis of the determined type.

2. The security processing device according to claim 1, wherein
the operation program in the non-secure area includes configuration data in which settings related to execution of the operation program are stored, and
in a case where the abnormality of the operation program in the non-secure area is diagnosed by the diagnosis program in the secure area, the instructions, when executed by the one or more processors, cause the one or more processors to rewrite the configuration data of the operation program in which the abnormality in the non-secure area is diagnosed to fail-safe configuration data stored in the secure area on a basis of a determination result of the type of the abnormality.

3. The security processing device according to claim 1, wherein
in a case where the abnormality of the operation program in the non-secure area is diagnosed by the diagnosis program in the secure area, the instructions, when executed by the one or more processors, cause the one or more processors to switch the operation program in which the abnormality in the non-secure area is diagnosed to another operation program in which the abnormality in the non-secure area is not diagnosed on a basis of a determination result of the type of the abnormality.

4. The security processing device according to claim 1, wherein
in a case where the abnormality of the operation program in the non-secure area is diagnosed by the diagnosis program in the secure area, the instructions, when executed by the one or more processors, cause the one or more processors to rewrite the operation program in which the abnormality in the non-secure area is diagnosed with a fail-safe program code stored in the secure area on a basis of a determination result of the type of the abnormality.

5. The security processing device according to claim 1, wherein
in a case where an abnormality in communication of the operation program of the non-secure area with the outside is diagnosed by the diagnosis program of the secure area, the instructions, when executed by the one or more processors, cause the one or more processors to output, from the secure area, a control instruction to interrupt a communication bus for which the abnormality is diagnosed and perform a degeneration operation.

6. The security processing device according to claim 1, wherein
in a case where abnormality due to a failure of hardware configuring the security processing device is diagnosed by the diagnosis program of the secure area, the instructions, when executed by the one or more processors, cause the one or more processors to output, from the secure area, a control instruction to separate the hardware for which the abnormality is diagnosed and perform a degeneration operation.

* * * * *